(12) United States Patent
Cao

(10) Patent No.: US 7,985,040 B2
(45) Date of Patent: Jul. 26, 2011

(54) SCREW ASSEMBLY

(75) Inventor: Xiang Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 79 days.

(21) Appl. No.: 12/436,760

(22) Filed: May 6, 2009

(65) Prior Publication Data

US 2010/0247270 A1    Sep. 30, 2010

(30) Foreign Application Priority Data

Mar. 24, 2009 (CN) .......................... 2009 1 0301095

(51) Int. Cl.
*F16B 37/12* (2006.01)

(52) U.S. Cl. ......... 411/178; 411/397; 411/404; 411/384

(58) Field of Classification Search ............... 411/397, 411/404, 177, 178
See application file for complete search history.

(56) References Cited

U.S. PATENT DOCUMENTS

| | | | | | |
|---|---|---|---|---|---|
| 1,194,792 | A | * | 8/1916 | Stewart | 411/338 |
| 2,258,326 | A | * | 10/1941 | Holt | 411/404 |
| 4,097,061 | A | * | 6/1978 | Dietlein | 280/607 |
| 4,486,134 | A | * | 12/1984 | White | 411/103 |
| 4,822,223 | A | * | 4/1989 | Williams | 411/82 |
| 5,312,005 | A | * | 5/1994 | Odell | 211/189 |
| 5,964,767 | A | * | 10/1999 | Tapia et al. | 606/323 |
| 6,293,745 | B1 | * | 9/2001 | Lu | 411/410 |
| 6,361,258 | B1 | * | 3/2002 | Heesch | 411/178 |
| 6,679,661 | B2 | * | 1/2004 | Huang | 411/29 |

* cited by examiner

*Primary Examiner* — Gary Estremsky
(74) *Attorney, Agent, or Firm* — Zhigang Ma

(57) ABSTRACT

A screw assembly includes hollow first screw and a second screw smaller than the first screw in size. A first thread is defined on an outer surface of the first screw. A receiving hole is defined in the first screw. The second screw is adapted to be received in the receiving hole to engage with the first screw.

4 Claims, 3 Drawing Sheets

SCREW ASSEMBLY

BACKGROUND

1. Technical Field

The present disclosure relates to screws, and more particularly to a screw assembly.

2. Description of Related Art

Screws are widely used as threaded fasteners to hold objects together. For example, when assembling a computer case, a variety of types of screws may be used to fasten system components, such as a motherboard, a hard disk drive, and a power supply to the computer case. These screws often have different sizes. Screws of smaller sizes are more prone to be lost. Looking for proper screws to replace the lost screws is much trouble during computer maintenance.

DETAILED DESCRIPTION

Figure 1:
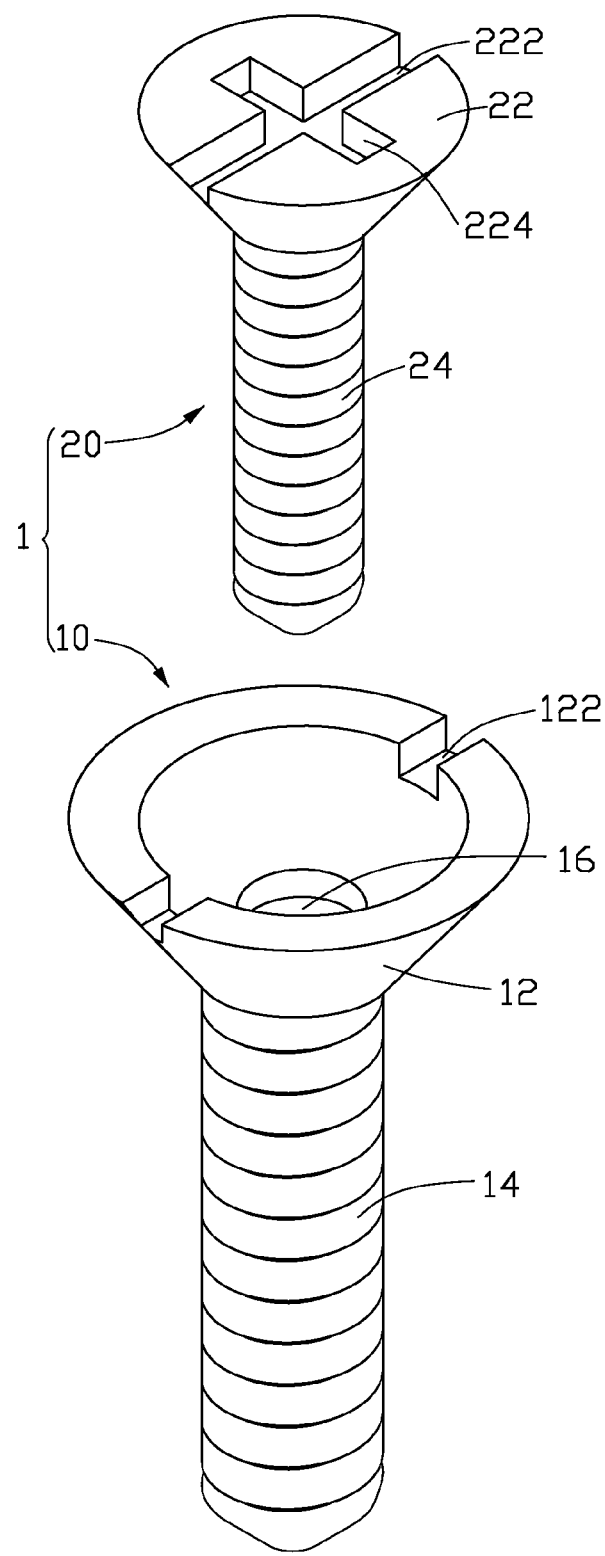
FIG. 1 is an exploded, isometric view of an embodiment of a screw assembly.
Figure 2:
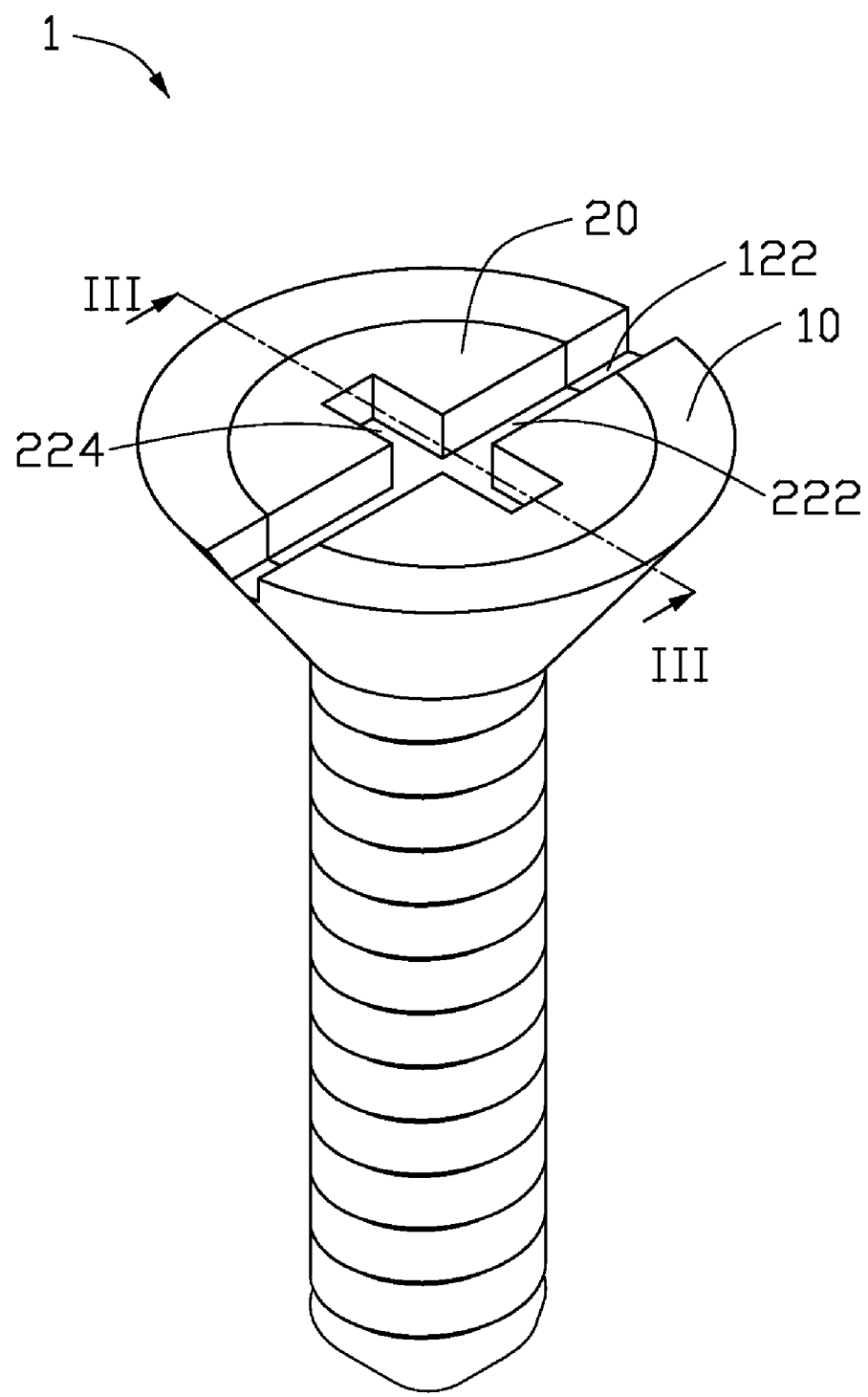
FIG. 2 is an assembled, isometric view of the screw assembly of FIG. 1.
Figure 3:
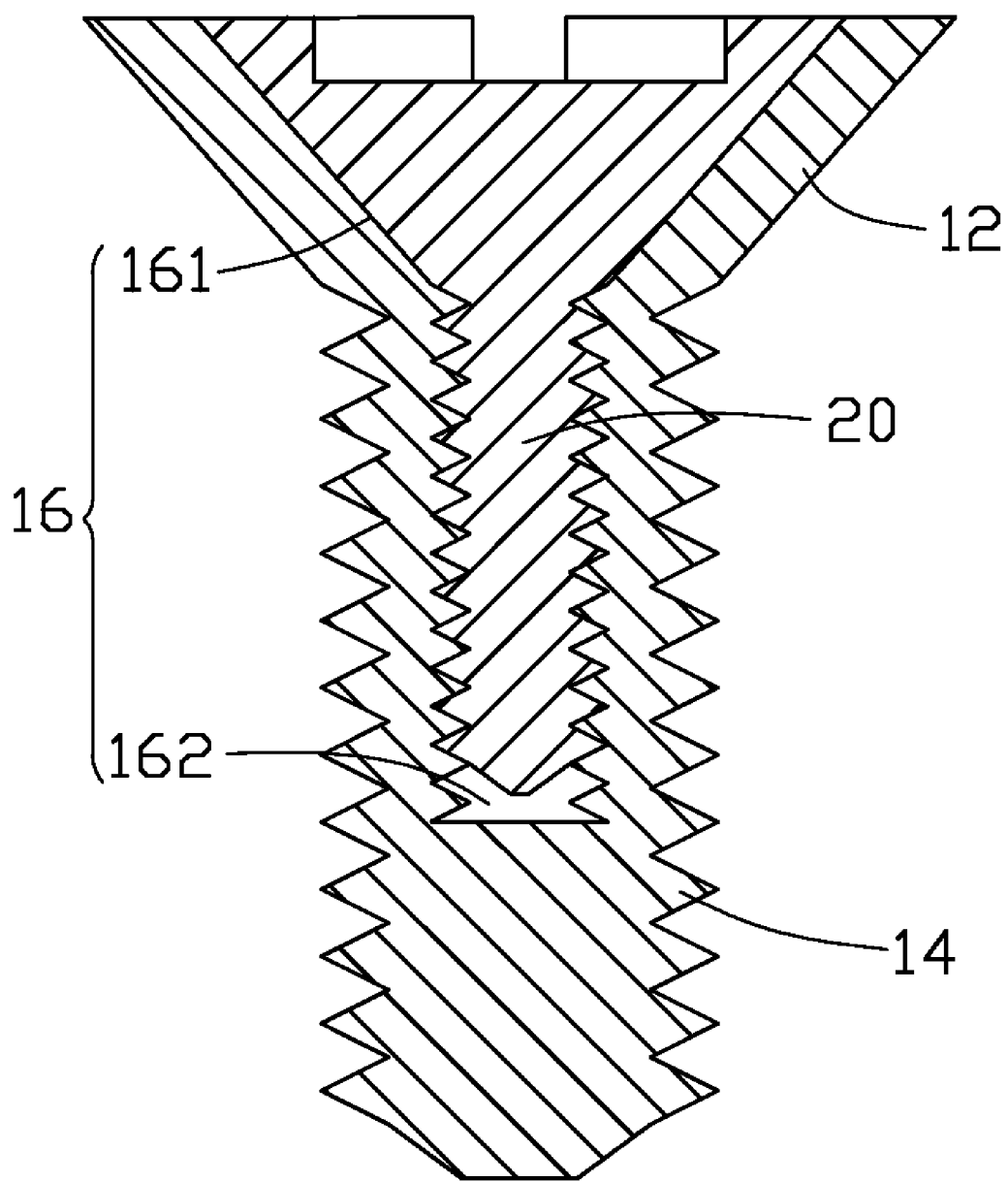
FIG. 3 is a sectional-view taken along the line III-III of the screw assembly of FIG. 2.

Referring to FIGS. 1 to 3, an embodiment of a screw assembly 1 includes a first screw 10 and a second screw 20 smaller than the first screw 10. The first screw 10 is substantially hollow and includes a head 12 and a shaft 14. The head 12 is positioned at an end of the shaft 12. The second screw 20 includes a shaft 24 and a head 22 positioned at an end of the shaft 24. A helical threading is defined along a circumference of each of the shafts 14 and 24. The heads 12 and 22 are tapered, in one example.

A tapered opening 161 is defined in the head 12 along a central axis of the first screw 10. A cylindrical opening 162 is defined in the shaft 14 along the central axis of the first screw 10. The tapered opening 161 and the cylindrical opening 162 communicate with each other to form a receiving hole 16 to receive the second screw 20. A helical threading is defined along an inner wall bounding the cylindrical opening 162 of the shaft 14, engageable with the shaft 24 of the second screw 20.

Two notches 122 are defined in a top surface around the tapered opening 161 of the head 12, aligned with each other. Two slots 222 and 224 are defined in a top surface of the head 22 orthogonally. The head 12 of the first screw 10 and the head 22 of the second screw 20 are engageable with different type of screw driver heads.

In use, the first screw 10 and the second screw 10 may be cooperatively adopted to fasten components having holes of great sizes. When the first screw 10 and the second screw 20 are engaged together, the slot 222 communicates with the notches 122. If necessary, the second screw 20 can be detached from the first screw 10 by a desired type of screwdriver, to fasten components of having holes of small sizes. Therefore, the second screw 20 may further be used as a spare.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A screw assembly, comprising:
   a substantially hollow first screw defining a receiving hole, wherein the first screw forms a first threading on an outer surface of the first screw, two notches are defined in the first screw, communicating with the receiving hole; and
   a second screw smaller than the first screw in size, the second screw comprising a second head, and the second head defining a first slot transversely extending through the second head, wherein the second screw is adapted to be received in the receiving hole to engage with the first screw, opposite ends of the first slot align and communicate with the two notches; the first screw comprises a first shaft and a first head extending from an end of the first shaft, the second screw comprises a second shaft extending from an end of the second head, the first threading is formed along a circumference of the first shaft of the first screw, the notches are defined in a top surface of the first head, aligned with each other; the first slot and a second slot are orthogonally defined in a top surface of the second head.

2. The screw assembly of 1, wherein the receiving hole comprises a first opening defined in the first head along a central axis of the first screw to receive the second head of the second screw, and a second opening defined in the first shaft along the central axis of the first screw to receive the second shaft of the second screw, wherein the first and second openings communicate with each other.

3. The screw assembly of claim 2, wherein a second threading is formed on an inner wall bounding the second opening of the first shaft of the first screw, a third threading is formed on a circumference of the second shaft of the second screw to engage with the second threading of the first screw.

4. A screw assembly, comprising:
   a first screw defining a receiving hole along a central axis of the first screw, wherein a first thread is formed on an outer surface of the first screw, and a second thread is formed on an inner wall bounding the receiving hole of the first screw, two notches are defined in the first screw, communicating with the receiving hole and aligned with each other; and
   a second screw adapted to be screwably received in the receiving hole, the second screw comprising a second head, and the second head defining a first slot transversely extending through the second head, wherein a third thread is formed on an outer surface of the second screw to engage with the second thread of the first screw, and opposite ends of the first slot align and communicate with the two notches.

* * * * *